US010583518B2

(12) United States Patent
Matsuyama et al.

(10) Patent No.: US 10,583,518 B2
(45) Date of Patent: Mar. 10, 2020

(54) METHOD FOR PRODUCING METAL MEMBER

(71) Applicant: KOMATSU LTD., Tokyo (JP)

(72) Inventors: Toshikazu Matsuyama, Hirakata (JP); Masaharu Amano, Hirakata (JP); Yoshitaka Shibata, Hirakata (JP)

(73) Assignee: KOMATSU LTD., Tokyo (JP)

( * ) Notice: Subject to any disclaimer, the term of this patent is extended or adjusted under 35 U.S.C. 154(b) by 278 days.

(21) Appl. No.: 15/560,353

(22) PCT Filed: Apr. 15, 2015

(86) PCT No.: PCT/JP2015/061592
§ 371 (c)(1),
(2) Date: Sep. 21, 2017

(87) PCT Pub. No.: WO2016/166842
PCT Pub. Date: Oct. 20, 2016

(65) Prior Publication Data
US 2018/0071859 A1    Mar. 15, 2018

(51) Int. Cl.
*B23K 20/12* (2006.01)
*B23K 103/22* (2006.01)

(52) U.S. Cl.
CPC ............ *B23K 20/12* (2013.01); *B23K 20/129* (2013.01); *B23K 2103/22* (2018.08)

(58) Field of Classification Search
None
See application file for complete search history.

(56) References Cited

U.S. PATENT DOCUMENTS 3,144,710 A * 8/1964 Camps-Campins ........................ B29C 66/12221
228/114.5
3,444,611 A * 5/1969 Bogart ................... B23K 20/12
228/114.5
(Continued)

FOREIGN PATENT DOCUMENTS

CN      1334168 A     2/2002
CN    104439731 A     3/2015
(Continued)

OTHER PUBLICATIONS

Jul. 14, 2015 International Search Report issued in International Patent Application No. PCT/JP2015/061592.

*Primary Examiner* — Devang R Patel
(74) *Attorney, Agent, or Firm* — Oliff PLC

(57) ABSTRACT

The method for producing a metal member includes a step of preparing a first member made of a first metal, a second member made of a second metal, and a third member made of a third metal, and a step of joining the first member and the second member via the third member. The step of joining includes a step of heating the first member, the second member, and the third member by stacking the first member, the third member, and the second member in this order and relatively rotating the first member about an axis of rotation, while pressing the first member against the third member, without changing a positional relationship, and a step of cooling the first member, the second member, and the third member heated, with the members being in the stacked state.

12 Claims, 11 Drawing Sheets

(56) References Cited

U.S. PATENT DOCUMENTS

| | | | | |
|---|---|---|---|---|
| 3,452,421 A | * | 7/1969 | McKinley | B23K 20/12 228/114.5 |
| 3,571,906 A | * | 3/1971 | Barth | B23K 20/12 228/113 |
| 3,853,258 A | * | 12/1974 | Louw | B23K 20/12 228/2.3 |
| 4,582,242 A | * | 4/1986 | Spindler | B23K 20/129 228/113 |
| 5,897,047 A | * | 4/1999 | Takei | B23K 20/12 228/114 |
| 6,638,641 B2 | * | 10/2003 | Delano | B23K 20/129 228/112.1 |
| 2001/0040179 A1 | * | 11/2001 | Tochigi | B23K 20/126 228/2.1 |
| 2007/0272728 A1 | | 11/2007 | Dzialas et al. | |
| 2008/0277451 A1 | * | 11/2008 | Slattery | B23K 20/12 228/2.1 |
| 2013/0180728 A1 | * | 7/2013 | Hugghins | B23K 20/129 166/378 |
| 2016/0265473 A1 | * | 9/2016 | Jiang | B23K 20/12 |

FOREIGN PATENT DOCUMENTS

| | | |
|---|---|---|
| JP | H06-000658 A | 1/1994 |
| JP | H06-063775 A | 3/1994 |
| JP | H10-89241 A | 4/1998 |
| JP | 2000-343246 A | 12/2000 |
| JP | 2012-125803 A | 7/2012 |
| WO | 2005/087424 A1 | 9/2005 |

* cited by examiner

METHOD FOR PRODUCING METAL MEMBER

TECHNICAL FIELD

The present invention relates to methods for producing metal members, and more specifically, to a method for producing a metal member having a structure in which members made of different metals are joined.

BACKGROUND ART

A metal member having a structure in which members made of different metals are fixed to each other may be used as a machine component. For example, as a piston shoe of a hydraulic pump or a hydraulic motor, one having a base section made of steel to which a sliding section made of copper alloy is fixed is known. As a piston shoe of this type, one in which the sliding section is fixed to the base section by caulking may be used.

In order for the sliding section to be fixed to the base section by caulking, the sliding section needs to be machined to a predetermined shape enabling the caulking, before being attached to the base section. This increases the production cost of the sliding component due to the expense required for machining the sliding section. On the other hand, a piston shoe in which the sliding section is fixed to the base section by pressing the sliding section against the base section so that the sliding section is deformed and thus engaged with the base section has been proposed (see, for example, Japanese Patent Application Laid-Open No. H10-89241 (Patent Literature 1)).

CITATION LIST

Patent Literature

Patent Literature 1: Japanese Patent Application Laid-Open No. H10-89241

SUMMARY OF INVENTION

Technical Problem

With the structure of the piston shoe described in Patent Literature 1 above, the sliding section is fixed to the base section only by engagement. If the piston shoe receives an impact, the fixed state of the sliding section to the base section may become unstable.

An object of the present invention is to provide a method for producing a metal member having a structure in which members made of different metals are joined together via a joint layer.

Solution to Problem

A method for producing a metal member according to the present invention includes the steps of: preparing a first member made of a first metal, a second member made of a second metal, and a third member made of a third metal; and joining the first member and the second member via the third member. The step of joining the first member and the second member includes a step of heating the first member, the second member, and the third member by stacking the first member, the third member, and the second member in this order and relatively rotating the first member with respect to the second member and the third member about an axis of rotation, while pressing the first member against the third member, without changing a positional relationship of the first member relative to the second member and the third member, and a step of cooling the first member, the second member, and the third member heated, with the members being in the stacked state.

In the metal member producing method of the present invention, the first member, the third member, and the second member are stacked in this order, and the first member is relatively rotated about an axis of rotation, while being pressed against the third member, without changing the positional relationship of the first member relative to the second member and the third member, so that the first member, the second member, and the third member are heated. The first member, the second member, and the third member heated are then cooled in the stacked state, whereby the first member and the second member are joined via the third member.

As such, according to the metal member producing method of the present invention, it is possible to produce the metal member having a structure in which the members made of different metals are joined together via the third member serving as a joint layer (intermediate layer).

In the metal member producing method described above, the second metal and the third metal may be smaller in deformation resistance than the first metal. In the step of heating the first member, the second member, and the third member, the second member and the third member may be disposed in a cavity of a mold.

By setting the deformation resistance of each of the second metal and the third metal smaller than that of the first metal, the second member and the third member in the cavity of the mold are deformed to contact the wall surfaces defining the cavity. This restricts rotation of the second member and the third member together with the first member, and also restricts further deformation of the members. Thus, the heat generated by the friction between the first member and the third member is prevented from being released from within the cavity. As a result, the step of heating the first member, the second member, and the third member can be performed efficiently.

In the metal member producing method described above, the mold may include a cavity bottom wall defining the cavity, and a cavity sidewall defining the cavity and extending in a direction intersecting the cavity bottom wall. This makes it possible to readily carry out the metal member producing method described above.

In the metal member producing method described above, in the step of heating the first member, the second member, and the third member, a third contact surface, being a surface of the third member coming into contact with the first member, may be surrounded by the cavity sidewall. With this configuration, the deformation of the second member and the third member can be limited by the cavity sidewall.

In the metal member producing method described above, in the step of heating the first member, the second member, and the third member, the first member may be rotated while the mold is fixed. This makes it possible to readily carry out the metal member producing method described above.

In the metal member producing method described above, the second metal and the third metal may be smaller in deformation resistance than the first metal. The first member may have a recessed portion formed therein. In the step of heating the first member, the second member, and the third member, the third member may be disposed in the recessed portion, and the second member in a state of being at least partially received in the recessed portion may be relatively rotated with respect to the third member while being relatively pressed against the third member, to heat the first member, the second member, and the third member.

With the deformation resistance of each of the second metal and the third metal being set smaller than that of the first metal, the second member and the third member are deformed in the recessed portion of the first member to thereby contact the wall surfaces defining the recessed portion. The deformation of the second member and the third member is limited by the wall surfaces defining the recessed portion of the first member. This prevents the heat generated by the friction between the first member and the third member from being released from within the recessed portion. As a result, the step of heating the first member, the second member, and the third member can be performed efficiently.

In the metal member producing method described above, the first member may include a recessed portion bottom surface defining the recessed portion, and a recessed portion side surface defining the recessed portion and extending in a direction intersecting the recessed portion bottom surface. In the step of heating the first member, the second member, and the third member, with the third member being disposed in contact with the recessed portion bottom surface of the first member, the second member may be relatively rotated while being relatively pressed against the third member. This makes it possible to readily carry out the metal member producing method described above.

In the metal member producing method described above, in the step of heating the first member, the second member, and the third member, the second member may be deformed to contact the recessed portion side surface. Limiting the deformation of the second member by the recessed portion side surface in this manner makes it possible to readily carry out the metal member producing method described above.

The metal member producing method described above may further include the step of, in a state where the first member and the second member are joined together, machining the first member to remove the recessed portion side surface. With this configuration, it is possible to obtain the metal member that is formed as the first member is joined at the recessed portion bottom surface to the second member via the third member.

In the metal member producing method described above, in the step of heating the first member, the second member, and the third member, the second member may be rotated while the first member is fixed. This makes it possible to readily carry out the metal member producing method described above.

The metal member producing method described above may further include the step of, in a state where the first member and the second member are joined together, removing a flash formed due to deformation of the second member in the step of heating the first member, the second member, and the third member. With this configuration, it is possible to obtain the metal member having removed therefrom the flash formed while joining the first member and the second member.

In the metal member producing method described above, the third member may be one that relaxes stress generated between the first member and the second member in a state where the first member and the second member are joined together. This prevents occurrence of cracking or the like due to the stress generated between the first member and the second member.

In the metal member producing method described above, in the step of heating the first member, the second member, and the third member, the second metal and the third metal in a temperature increased state may each have a deformation resistance smaller by 10% or more as compared to a deformation resistance of the first metal in a temperature increased state. This facilitates joining of the first member and the second member via the third member.

Effects of the Invention

As is clear from the above description, according to the metal member producing method in the present invention, it is possible to produce the metal member having a structure in which members made of different metals are joined together via a joint layer.

DESCRIPTION OF EMBODIMENTS

Figure 1:
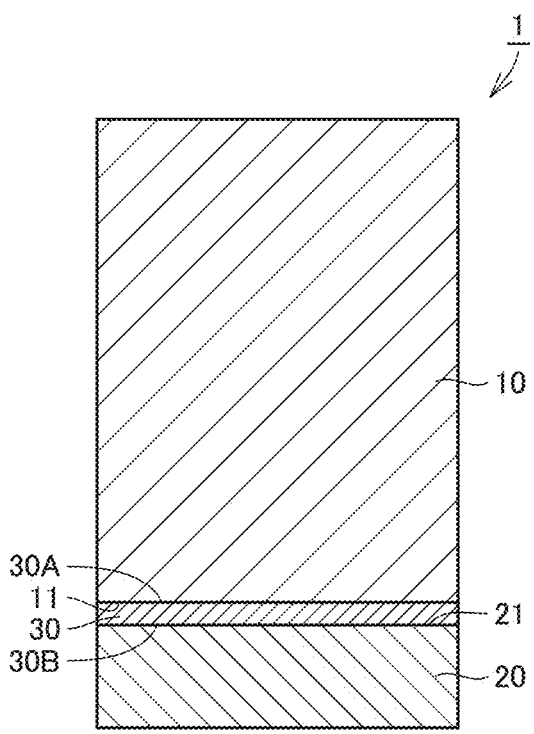
FIG. 1 is a schematic cross-sectional view showing the structure of a metal member according to a first embodiment.

Embodiments of the present invention will now be described. In the following drawings, the same or corresponding parts are denoted by the same reference numerals, and the description thereof will not be repeated.

First Embodiment

FIG. 1 is a schematic cross-sectional view showing the structure of a metal member (machine component) that can be produced by the method for producing a metal member according to the present embodiment. Referring to FIG. 1, the metal member 1 has a structure in which a first member 10 made of a first metal and a second member 20 made of a second metal are joined via a third member 30 made of a third metal.

The first member 10 has a cylindrical shape. One end face 11 of the first member 10 serves as a joint surface. The second member 20 has a cylindrical (disk) shape. One end face 21 of the second member 20 serves as a joint surface. The third member 30 has a disk shape. The third member 30 is a joint layer (intermediate layer) interposed between the first member 10 and the second member 20.

The third member 30 is arranged on the second member 20 such that an end face 30B of the third member 30 comes into contact with the one end face 21 of the second member 20. The first member 10 is arranged on the third member 30 such that the one end face 11 of the first member 10 comes into contact with an end face 30A of the third member 30.

The second metal constituting the second member 20 and the third metal constituting the third member 30 are smaller in deformation resistance than the first metal constituting the first member 10. In the present embodiment, for the first metal, for example, thermally refined steel (quenched and tempered) (for example, JIS SCM440 or other alloy steel for machine structural use or carbon steel for machine structural use) is adopted. For the second metal, copper alloy (for example, high-strength brass) is adopted. For the third metal, copper is adopted. The third member 30 serves to relax the stress generated between the first member 10 and the second member 20 in the state where the first member 10 and the second member 20 are joined together.

This metal member 1 can be produced by the method for producing a metal member in the present embodiment as follows.

Figure 2:
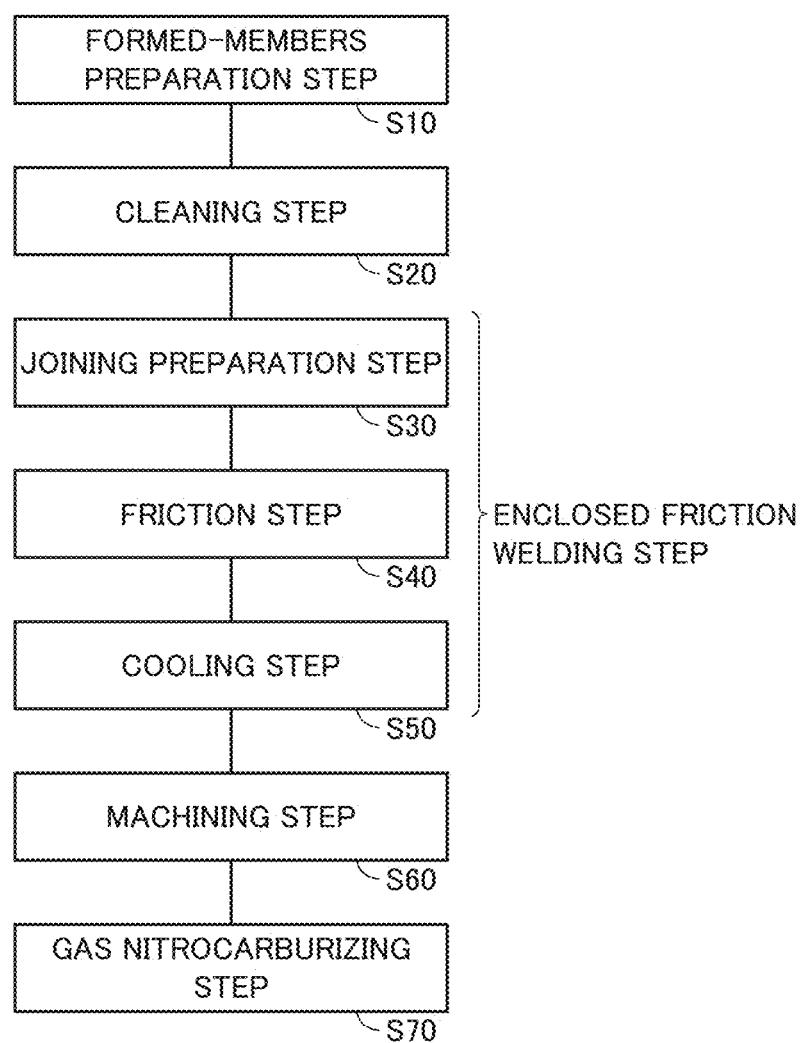
FIG. 2 is a flowchart schematically illustrating a method for producing a metal member.
Figure 3:
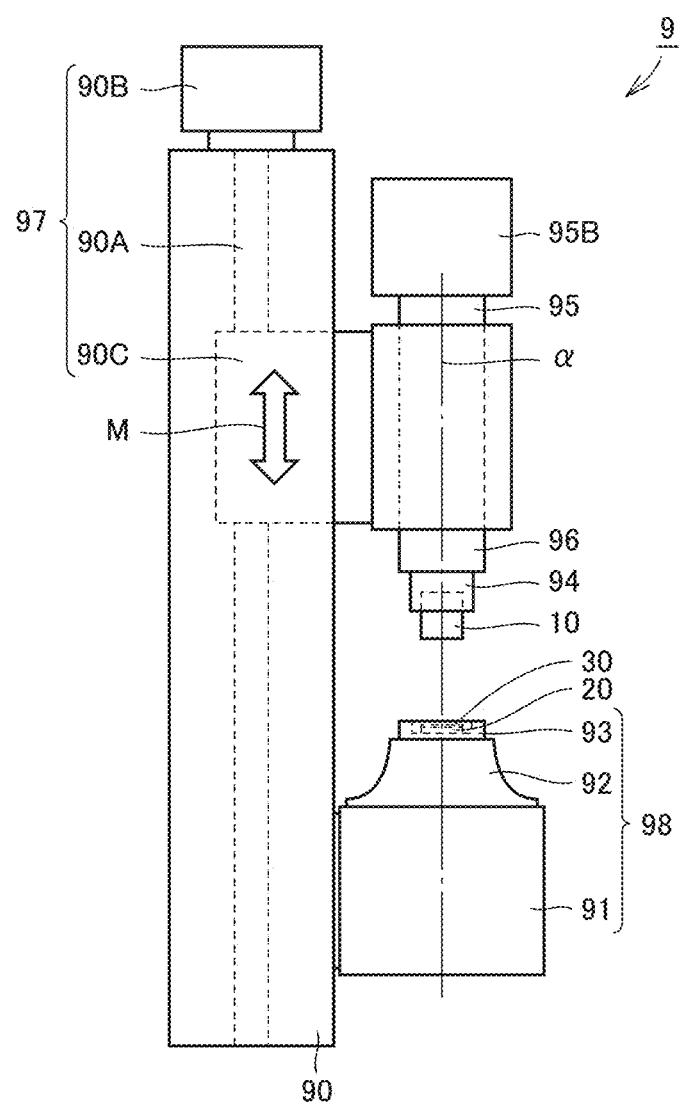
FIG. 3 is a schematic diagram showing the structure of a device for producing a metal member.
Figure 4:
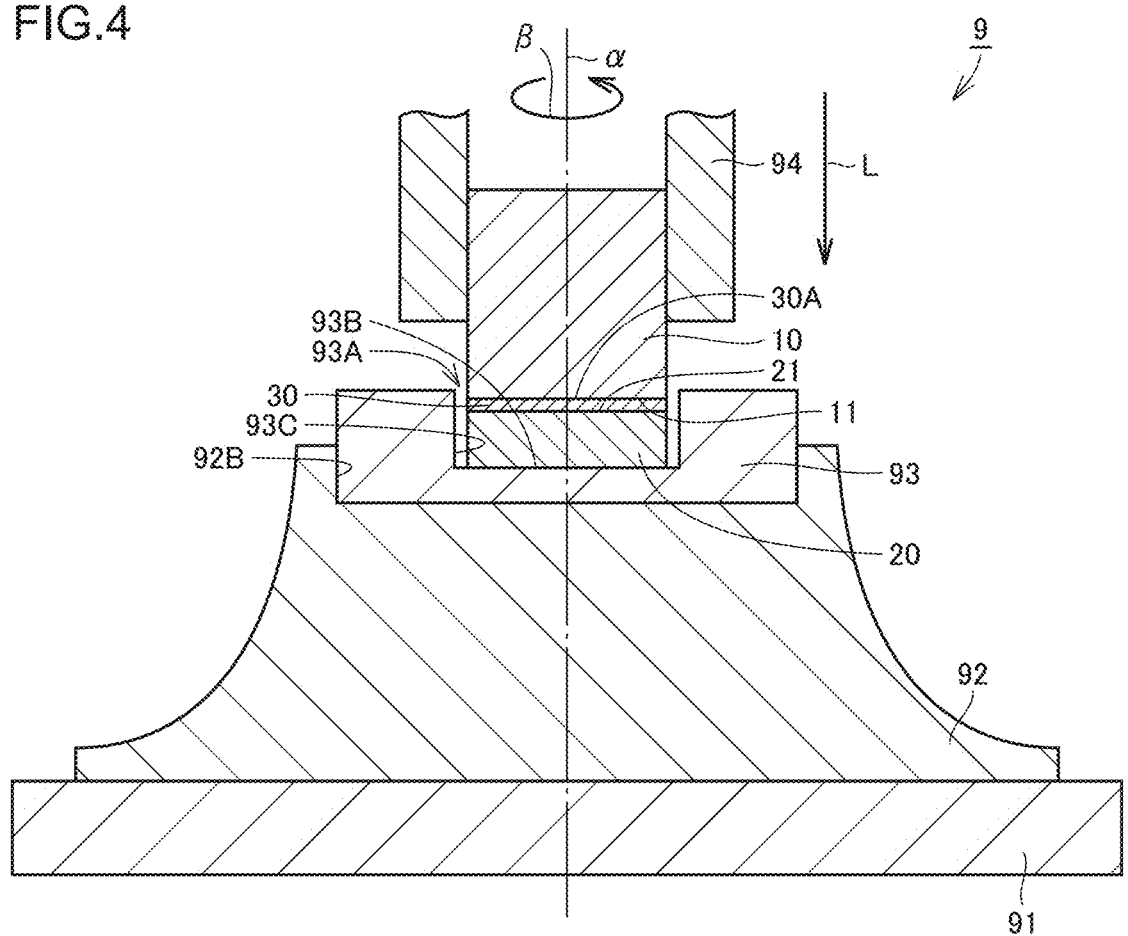
FIG. 4 is a schematic cross-sectional view showing the operation of the metal member producing device according to the first embodiment.
Figure 5:
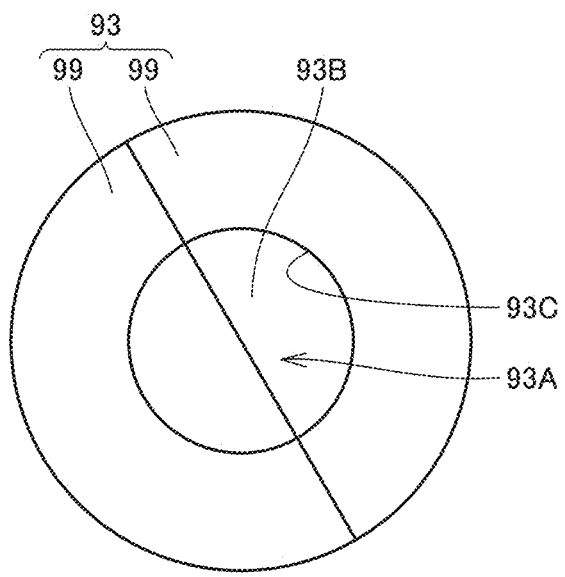
FIG. 5 is a schematic plan view showing the structure of a mold.

FIG. 2 is a flowchart schematically illustrating the method for producing a metal member. FIG. 3 is a schematic diagram showing the structure of a device for producing a metal member. FIG. 4 is a schematic cross-sectional view showing the operation of the metal member producing device. FIG. 5 is a schematic plan view showing the structure of a mold included in the metal member producing device.

Referring to FIG. 2, in the method for producing the metal member 1 in the present embodiment, first, a formed-members preparation step is carried out as a step S10. In this step S10, referring to FIG. 1, a cylindrical first member 10, made of thermally refined alloy steel for machine structural use, a disk-shaped second member 20, made of high-strength brass, and a disk-shaped or foil-like third member 30, made of copper, for example, are prepared. One end face 11 of the first member 10 serves as a first member contact surface, which is a flat surface to be a joint surface. One end face 21 of the second member 20 serves as a second member contact surface, which is a flat surface to be a joint surface.

Next, a cleaning step is carried out as a step S20. In this step S20, the first member 10, the second member 20, and the third member 30 prepared in the step S10 are cleaned. The first member 10, the second member 20, and the third member 30 are cleaned using methanol, ethanol, acetone, or other liquid. This removes any foreign matters attached to the first member 10, the second member 20, or the third member 30 during the cutting, machining, or other processes for preparing the first member 10, the second member 20, and the third member 30. In the method for producing the metal member 1 in the present embodiment, precision finish work on the end faces of the second member 20 and the third member 30 may be omitted; the end faces of the second member 20 and the third member 30 may be left as cut.

Next, referring to FIG. 2, an enclosed friction welding step is carried out. This enclosed friction welding step includes a joining preparation step, a friction step, and a cooling step. Here, a device for producing a metal member which produces the metal member 1 by conducting enclosed friction welding will be described.

Referring to FIG. 3, an enclosed friction welding device 9 which is the device for producing a metal member includes: a spindle 95 which is rotatable about an axis $\alpha$, a base portion 98 disposed spaced apart from the spindle 95 in the axis $\alpha$ direction, a driving portion 97 which adjusts the spacing between the spindle 95 and the base portion 98 by driving the spindle 95 in the axis $\alpha$ directions, and a frame 90 which supports the spindle 95 and the base portion 98.

Referring to FIG. 3, inside the frame 90, a shaft 90A is disposed to extend in parallel with the axis $\alpha$. This shaft 90A supports a spindle support portion 90C which supports the spindle 95, so as to allow the spindle support portion 90C to move in the directions in which the shaft 90A extends. A spindle moving motor 90B for driving the shaft 90A is connected to the shaft 90A. As the shaft 90A is driven by the spindle moving motor 90B, the spindle 95 supported by the spindle support portion 90C moves in the axis $\alpha$ directions. This enables adjustment of the spacing between the spindle 95 and the base portion 98. The shaft 90A, the spindle support portion 90C, and the spindle moving motor 90B constitute the driving portion 97.

A rotation-side chuck 94 and a mold 93 are arranged so that, in a state (shown in FIG. 4) where the first member 10 and the third member 30 are made to contact each other with the spacing between the spindle 95 and the base portion 98 adjusted by the driving portion 97, a cavity sidewall 93C defining a cavity 93A surrounds the outer periphery of the one end face 30A, which serves as a third contact surface at which the third member 30 comes into contact with the first member 10. Referring to FIG. 4, the cavity sidewall 93C has a height in the axis $\alpha$ direction that is greater than a sum of the thicknesses of the second member 20 and the third member 30.

Referring to FIG. 3, the spindle 95 includes the rotation-side chuck 94, which is a first holding portion for holding the first member 10 to oppose the base portion 98. The spindle 95 has connected thereto a spindle motor 95B which rotatively drives the spindle 95 about the axis $\alpha$. The spindle 95 further has mounted thereon a load sensor 96 which detects a contact load between the first member 10 and the third member 30. The load sensor 96 detects the contact load between the first member 10 and the third member 30 from the magnitude of the contact reaction force between the first member 10 and the third member 30 that is applied to the rotation-side chuck 94. Although the load sensor 96 is not an indispensable component for the enclosed friction welding device 9, the sensor, when provided, facilitates adjusting the contact load between the first member 10 and the third member 30 to an appropriate range.

The base portion 98 has the mold 93 disposed thereon, which is a second holding portion for holding the second member 20 to oppose the rotation-side chuck. Referring to FIGS. 3 and 4, the base portion 98 includes a base body 91, a mold holder 92, and the mold 93. The base body 91 is disposed on the frame 90. The mold holder 92 is fixed on the base body 91. The mold 93 is fitted in a mold holding portion, which is a recessed portion formed in the mold holder 92, and is fixed by a radial chuck surface 92B. The mold 93 can be separated into two parts 99, 99, as shown in FIG. 5.

Referring to FIGS. 4 and 5, the mold 93 includes: a cavity bottom wall 93B which is a circular flat surface, and a cavity sidewall 93C which extends from the cavity bottom wall 93B in a direction intersecting (direction perpendicular to) the cavity bottom wall 93B. The cavity bottom wall 93B and the cavity sidewall 93C define the cavity 93A. The cavity sidewall 93C, which is connected to the outer periphery of the cavity bottom wall 93B of a circular shape, has a cylindrical surface shape having the same diameter as the cavity bottom wall 93B.

A specific procedure of the enclosed friction welding step will now be described. Referring to FIGS. 3 and 4, in the joining preparation step carried out as a step S30, the first member 10 is held at the outer peripheral surface by the rotation-side chuck 94, and the second member 20 and the third member 30 are set in the cavity 93A of the mold 93.

The second member 20 is arranged so that its end face contacts the cavity bottom wall 93B defining the cavity 93A. The third member 30 is arranged in a stacked manner so that its end face contacts the one end face 21 of the second member 20. The first member 10, the second member 20, and the third member 30 are arranged so that the one end face 11 of the first member 10 and the one end face 30A of the third member 30 oppose each other, and that the central axes of the first member 10, the second member 20, and the third member 30 agree with the rotational axis α of the rotation-side chuck.

A release agent is introduced into the cavity 93A. Thus, in a step S40 described below, the first member 10, the second member 20, and the third member 30 are heated in the presence of the release agent in the cavity 93A. Although introduction of the release agent is not an indispensable procedure, the release agent, when introduced, facilitates removal of a structural body formed with the first member 10 and the second member 20 joined via the third member 30, from the mold 93 in a step S50 described later. The release agent may be liquid or powder.

Next, the friction step is carried out as a step S40. In this step S40, the spindle 95 is driven by the spindle motor 95B to rotate about the axis α, and it is also driven by the spindle moving motor 90B to approach the base portion 98. Consequently, the rotation-side chuck 94 approaches the mold 93 while rotating about the axis α.

When the first member 10 comes into contact with the third member 30, the members attain the state where the first member 10, the third member 30, and the second member 20 are stacked in this order. Then, the first member 10 relatively rotates about the rotational axis, while being pressed against the third member 30, without changing its positional relationship relative to the second member 20 and the third member 30. The temperature increases at the contact portions of the first member 10 and the third member 30 because of the frictional heat. The first member 10, the second member 20, and the third member 30 are heated with the frictional heat. The temperature of the second member 20 increases, for example, to a temperature that is not lower than the softening point and lower than the melting point of the second metal constituting the second member 20. The temperature of the third member 30 increases, for example, to a temperature that is not lower than the softening point and lower than the melting point of the third metal constituting the third member 30.

The second member 20 and the third member 30 each have a deformation resistance smaller than that of the first member 10, as explained above. The heated second member 20 and third member 30 soften and deform, thereby coming into contact with the cavity sidewall 93C of the mold 93. This restricts rotation of the second member 20 and the third member 30 together with the first member 10, and also restricts further deformation of those members. The friction between the first member 10 and the third member 30 generates further heat, and the generated heat is prevented from being released from within the cavity 93A.

Next, the cooling step is carried out as a step S50. In this step S50, first, the rotational speed of the spindle 95 is lowered, and the rotation is stopped. Thereafter, the pressing load detected by the load sensor 96 is decreased. During this time, the first member 10, the second member 20, and the third member 30 are cooled, while being maintained in the state where the first member 10 and the second member 20 are pressed against each other with the third member 30 sandwiched therebetween. The first member 10, the second member 20, and the third member 30 are cooled in the stacked state. Accordingly, the first member 10 and the second member 20 are joined via the third member 30.

Then, the pressing load is set to zero, and the metal member 1, which is the structural body formed with the first member 10 and the second member 20 joined via the third member 30, is taken out from the enclosed friction welding device 9. Through the above procedure, the enclosed friction welding step is completed.

Next, a machining step is carried out as a step S60. In this step S60, the metal member 1 obtained in the step S50 is subjected to machining. In the step S60, for example, the flash formed due to deformation of the second member 20 in the step S40 is removed.

Next, a gas nitrocarburizing step is carried out as a step S70. In this step S70, the gas nitrocarburizing processing is performed on the metal member 1 obtained through the machining in the step S60. Specifically, as the metal member is heated within an atmosphere including ammonia gas to a temperature lower than the $A_1$ transformation point of the steel constituting the first member 10, a nitrided layer is formed in the surface portion of the first member 10. Thereafter, finishing processing is performed as appropriate, whereby the metal member 1 according to the present embodiment is completed.

As described above, according to the method for producing the metal member 1 using the enclosed friction welding device 9 in the present embodiment, it is possible to produce the metal member 1 having a structure in which the first member 10 made of the first metal and the second member 20 made of the second metal having a smaller deformation resistance than the first metal are joined via the third member 30 made of the third metal having a smaller deformation resistance than the first metal. The metal member 1 having a structure in which the first member 10 and the second member 20 made of different metals are joined together via the third member 30 as a joint layer can be produced. The first member 10, the second member 20, and the third member 30 can be joined simultaneously.

Further, copper as the third metal constituting the third member 30 has a coefficient of thermal expansion that is greater than that of steel as the first metal constituting the first member 10 and smaller than that of brass as the second metal constituting the second member 20. Thus, the third member 30 is able to relax the stress between the first member 10 and the second member 20 that is generated because of the difference in thermal expansion coefficient in the heat treatment performed in the step S70. The interposition of the third member 30 between the first member 10 and the second member 20 prevents occurrence of cracking due to the above-described stress generated because of the difference in thermal expansion coefficient.

Second Embodiment

A second embodiment as another embodiment of the present invention will now be described. The metal member produced in the second embodiment has a structure basically identical to that in the first embodiment. The metal member 1 according to the second embodiment, however, is different from that in the first embodiment in that the third member 30 has an annular shape.

Figure 6:
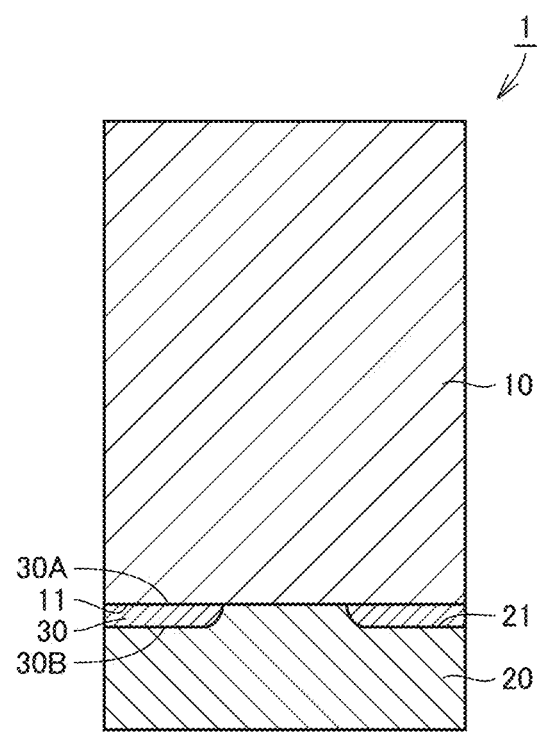
FIG. 6 is a schematic cross-sectional view showing the structure of a metal member according to a second embodiment.

Referring to FIG. 6, a third member 30 according to the second embodiment has an annular shape. The third member 30 has a ring shape with a through hole formed in the region including the central axis. In the region corresponding to the through hole of the third member 30, the first member 10 and the second member 20 are joined directly.

Such a metal member 1 can be produced by the method for producing a metal member according to the second embodiment as follows. The metal member producing method according to the second embodiment is performed basically in a similar manner and provides similar effects as in the first embodiment. The metal member producing method according to the second embodiment differs from that in the first embodiment in that a ring-shaped third member 30 is used.

Figure 7:
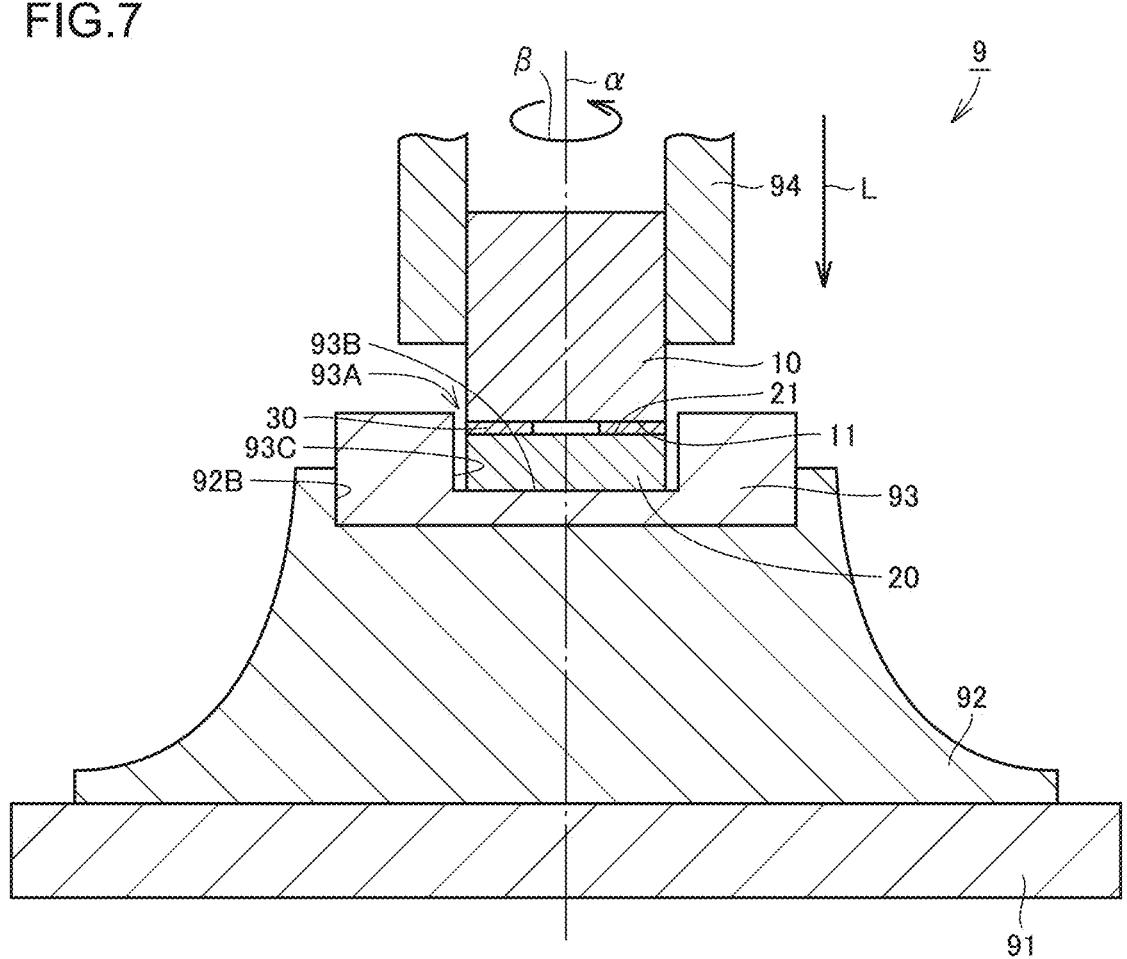
FIG. 7 is a schematic cross-sectional view showing the operation of a metal member producing device according to the second embodiment.

Referring to FIGS. 2 and 7, in the step S10 (formed-members preparation step) in the second embodiment, a ring-shaped third member 30 is prepared. The ring-shaped third member 30 is then used to perform the enclosed friction welding step, so that the softened second member 20 enters into the through hole of the third member 30, whereby the metal member 1 according the present embodiment is obtained.

The stress that is generated due to the difference in thermal expansion coefficient increases with decreasing distance from the outer peripheral surface of the metal member 1. With the third member 30 interposed between the first member 10 and the second member 20 in the region including the outer peripheral surface of the metal member 1, the stress can be relaxed effectively in the region where the stress is large.

Third Embodiment

Figure 8:
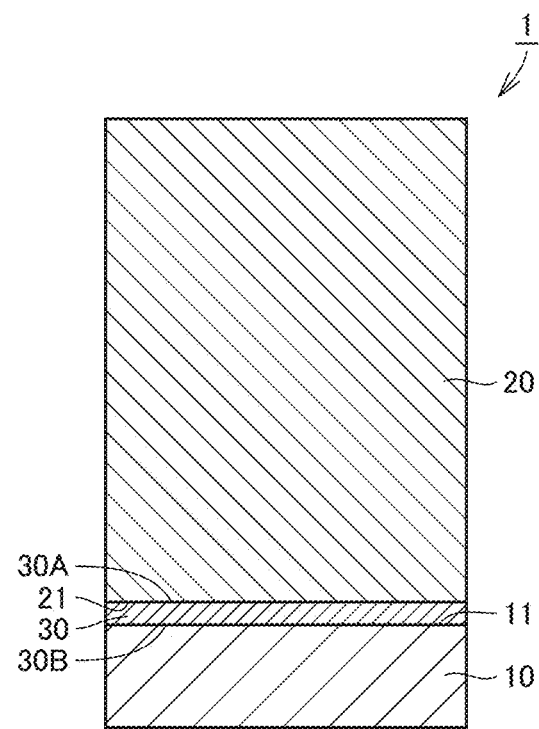
FIG. 8 is a schematic cross-sectional view showing the structure of a metal member according to a third embodiment.

A third embodiment as yet another embodiment of the present invention will now be described. FIG. 8 is a schematic cross-sectional view showing the structure of a metal member (machine component) that can be produced by the method for producing a metal member according to the third embodiment. Referring to FIG. 8, the metal member 1 has a structure in which a first member 10 made of a first metal and a second member 20 made of a second metal are joined via a third member 30 made of a third metal.

The first member 10 has a cylindrical (disk) shape. One end face 11 of the first member 10 serves as a joint surface. The second member 20 has a cylindrical shape. One end face 21 of the second member 20 serves as a joint surface. The third member 30 has a disk shape. The third member 30 is a joint layer (intermediate layer) interposed between the first member 10 and the second member 20. For the first metal, the second metal, and the third metal, metals similar to those in the first embodiment are adopted.

The third member 30 is arranged on the second member 20, with one end face 30A of the third member 30 being in contact with the one end face 21 of the second member 20. The first member 10 is arranged on the third member 30, with the one end face 11 of the first member 10 being in contact with the other end face 30B of the third member 30. The third member 30 serves to relax the stress generated between the first member 10 and the second member 20 in the state where the first member 10 and the second member 20 are joined together.

This metal member 1 can be produced by the method for producing a metal member in the present embodiment as follows.

Figure 9:
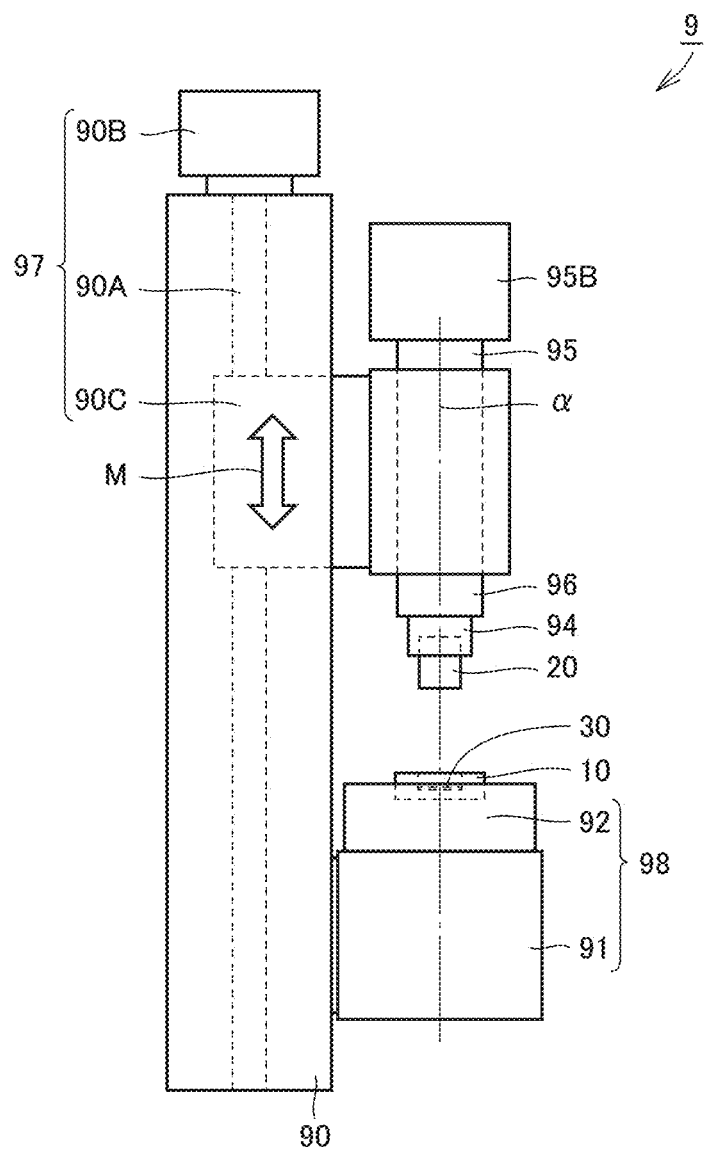
FIG. 9 is a schematic diagram showing the structure of a metal member producing device according to the third embodiment.
Figure 10:
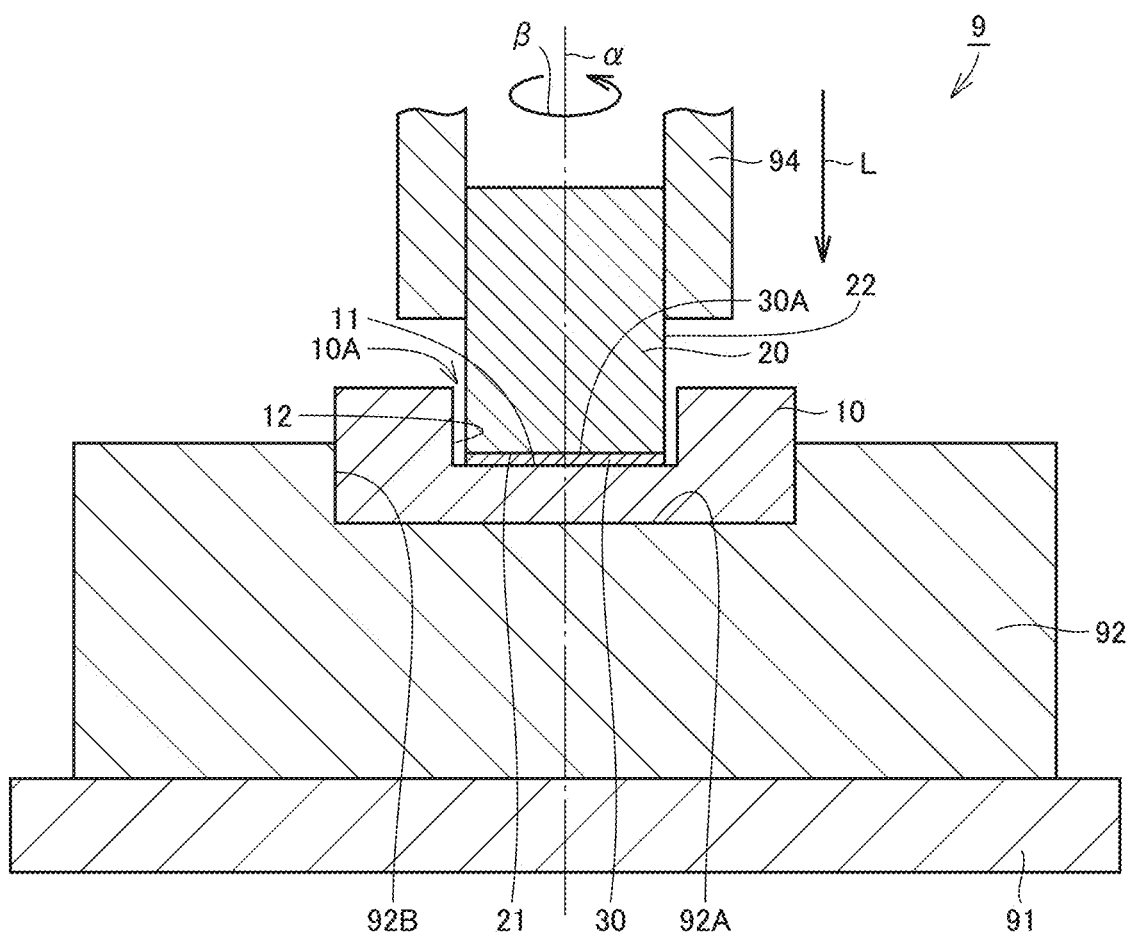
FIG. 10 is a schematic cross-sectional view showing the operation of the metal member producing device according to the third embodiment.
Figure 11:
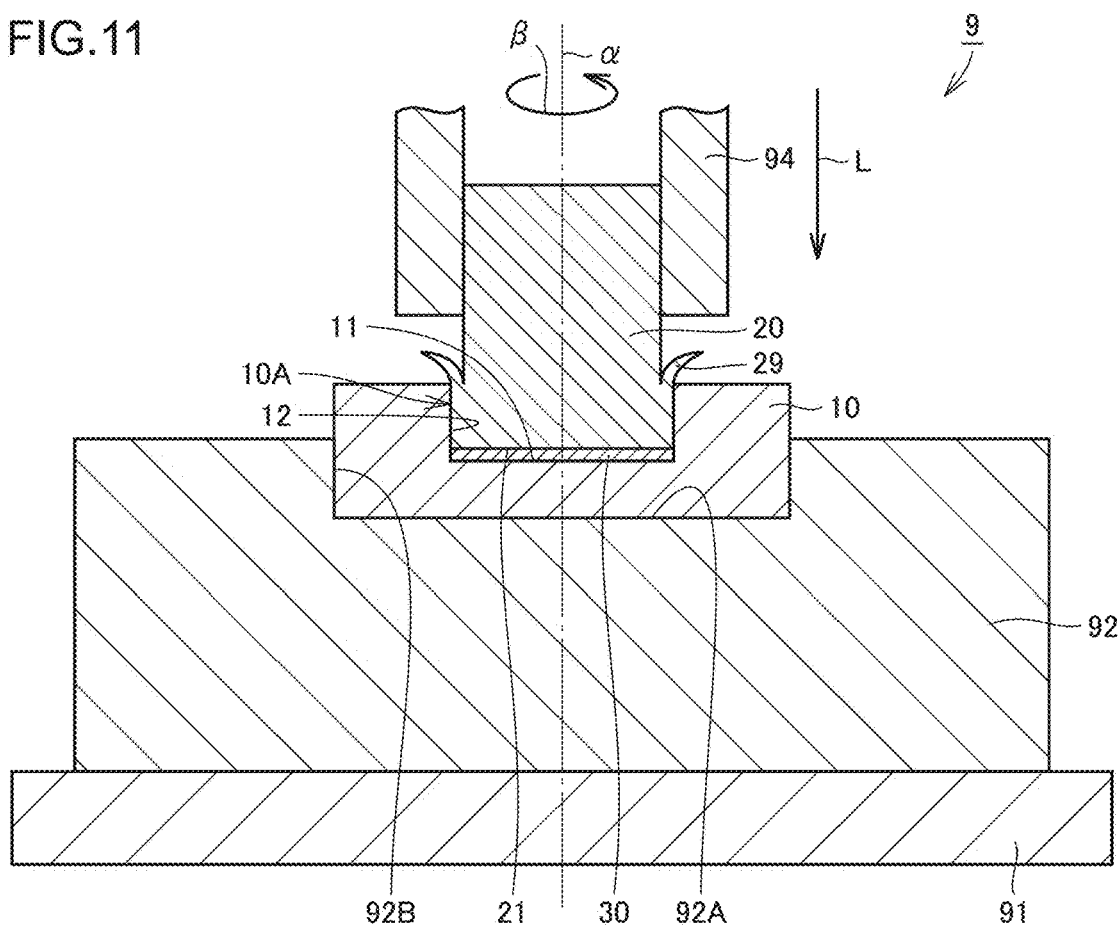
FIG. 11 is a schematic cross-sectional view illustrating a metal member producing method according to the third embodiment.
Figure 12:
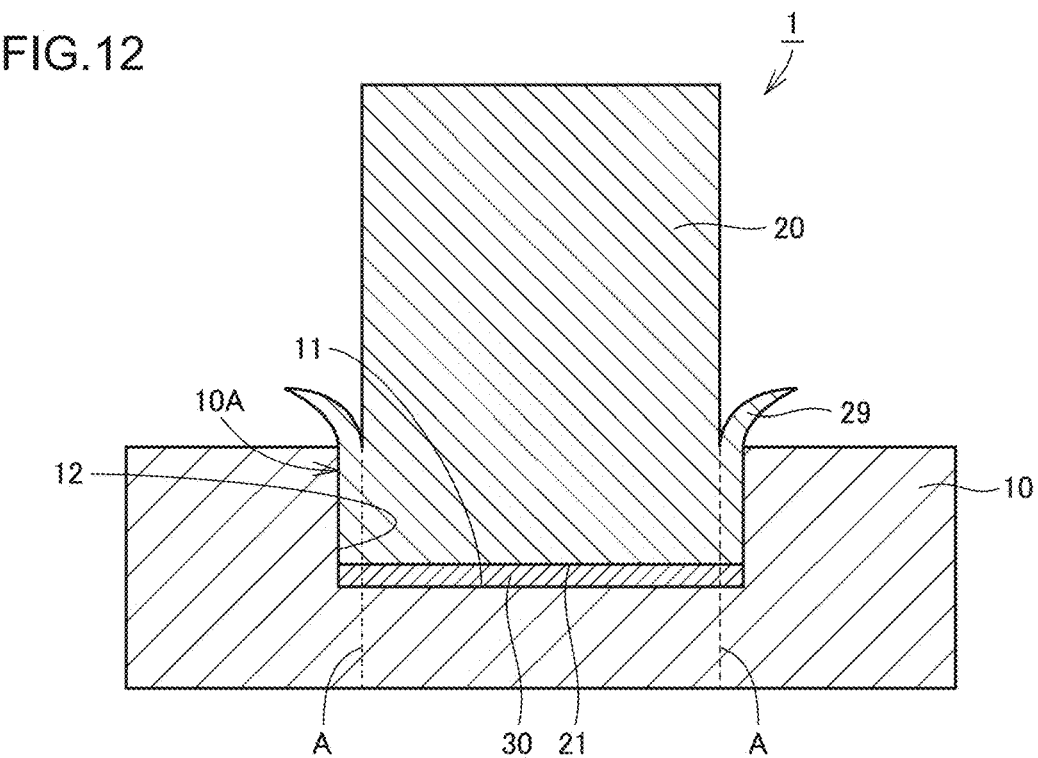
FIG. 12 is another schematic cross-sectional view illustrating the metal member producing method according to the third embodiment.

FIG. 2 is a flowchart schematically illustrating the method for producing a metal member. FIG. 9 is a schematic diagram showing the structure of a device for producing a metal member. FIG. 10 is a schematic cross-sectional view showing the operation of the metal member producing device. FIGS. 11 and 12 are schematic cross-sectional views illustrating the metal member producing method.

Referring to FIG. 2, in the method for producing the metal member 1 in the present embodiment, first, a formed-members preparation step is carried out as a step S10. In this step S10, referring to FIG. 10, a first member 10, made of thermally refined alloy steel for machine structural use, a second member 20, made of high-strength brass, and a third member 30, made of copper, for example, are prepared. The second member 20 has a cylindrical shape. The third member 30 has a disk shape or a foil shape.

The first member 10 has a cylindrical shape (disk shape). The first member 10 has a recessed portion 10A. The recessed portion 10A is formed to include a central axis of the first member 10. The recessed portion 10A has a cylindrical shape. The central axis of the first member 10 and the central axis of the recessed portion 10A are aligned with each other. The first member 10 includes a recessed portion bottom surface 11 defining the recessed portion 10A, and a recessed portion side surface 12 defining the recessed portion 10A and extending in a direction intersecting the recessed portion bottom surface 11.

The recessed portion bottom surface 11 of the first member 10 serves as a first member contact surface, which is a flat surface to be joined to the second member 20 via the third member 30. The one end face 21 of the second member 20 serves as a second member contact surface, which is a flat surface to be joined to the first member 10 via the third member 30.

Next, a cleaning step is carried out as a step S20. This step S20 is performed similarly as in the first embodiment. In the method for producing the metal member 1 in the present embodiment, precision finish work on the one end face 21 of the second member 20 may be omitted; the one end face 21 of the second member 20 may be left as cut.

Next, referring to FIG. 2, an enclosed friction welding step is carried out. This enclosed friction welding step includes a joining preparation step, a friction step, and a cooling step. Here, a device for producing a metal member which produces the metal member 1 by conducting enclosed friction welding will be described.

Referring to FIG. 9, the enclosed friction welding device 9 as the metal member producing device in the third embodiment basically has a similar structure and operates in a similar manner as in the first embodiment. The differences from the first embodiment will be described below.

The spindle 95 includes a rotation-side chuck 94, which holds the second member 20 to oppose the base portion 98. The base portion 98 includes a fixed-side chuck 92, which holds the first member 10 to oppose the rotation-side chuck 94. Referring to FIGS. 9 and 10, the base portion 98 includes a base body 91 and the fixed-side chuck 92. The fixed-side chuck 92 is fixed on the base body 91. The fixed-side chuck 92 includes a bottom surface 92A, which holds the first member 10 in the axial direction, and a radial chuck surface 92B, which holds the first member 10 in the radial direction.

A specific procedure of the enclosed friction welding step will now be described. Referring to FIG. 9, in the joining preparation step carried out as a step S30, the second member 20 is held at the outer peripheral surface by the rotation-side chuck 94. The first member 10 is held at the outer peripheral surface by the fixed-side chuck 92. The third member 30 is disposed in the recessed portion 10A of the first member 10. An end face of the third member 30 comes into contact with the recessed portion bottom surface 11.

The first member 10, the second member 20, and the third member 30 are arranged so that the third member 30 arranged on the recessed portion bottom surface 11 of the first member 10 has its one end face 30A opposing the one end face 21 of the second member 20, and that the central axes of the first member 10, the second member 20, and the third member 30 agree with the rotational axis α of the rotation-side chuck 94.

Next, the friction step is carried out as a step S40. In this step S40, the spindle 95 is driven by the spindle motor 95B to rotate about the axis α, and it is also driven by the spindle moving motor 90B to approach the base portion 98. Consequently, the rotation-side chuck 94 approaches the fixed-side chuck 92 while rotating about the axis α.

Then, as shown in FIG. 10, in a state where at least a part (a region including the one end face 21) of the second member 20 is received in the recessed portion 10A, the second member 20 relatively rotates, while being pressed against the third member 30 with a prescribed load, without changing its position relative to the first member 10 and the third member 30. The second member 20 rotates while being relatively pressed against the one end face 30A of the third member 30. This increases the temperatures of the first member 10, the second member 20, and the third member 30 because of the frictional heat.

At the beginning of rotation, there is a gap between an outer peripheral surface 22 of the second member 20 and the recessed portion side surface 12 of the first member 10. At the start of rotation, the outer peripheral surface 22 of the second member 20 is not in contact with the recessed portion side surface 12 of the first member 10.

The second member 20 has a deformation resistance smaller than that of the first member 10, as explained above. Referring to FIG. 11, the heated second member 20 softens and deforms, thereby contacting the recessed portion side surface 12. The deformation of the second member 20 is limited by the wall surfaces (recessed portion bottom surface 11 and recessed portion side surface 12) defining the recessed portion 10A of the first member 10. This prevents the heat generated by the friction from being released from within the recessed portion 10A. The recessed portion 10A is filled with the softened second and third members 20 and 30. A flash 29 is formed due to deformation of the second member 20. The temperature of the second member 20 increases, for example, to a temperature that is not lower than the softening point and lower than the melting point of the second metal constituting the second member 20. The temperature of the third member 30 increases, for example, to a temperature that is not lower than the softening point and lower than the melting point of the third metal constituting the third member 30.

Next, the cooling step is carried out as a step S50. In this step S50, first, the rotational speed of the spindle 95 is lowered, and the rotation is stopped. Thereafter, the pressing load detected by the load sensor 96 is decreased. During this time, the first member 10, the second member 20, and the third member 30 are cooled, while being maintained in the state where the first member 10 and the second member 20 are pressed against each other with the third member 30 sandwiched therebetween. The first member 10, the second member 20, and the third member 30 are cooled in the stacked state. Accordingly, the first member 10 and the second member 20 are joined via the third member 30.

Then, the pressing load is set to zero, and the metal member 1, which is the structural body formed with the first member 10 and the second member 20 joined via the third member 30, is taken out from the enclosed friction welding device 9 (see FIG. 12). Through the above procedure, the enclosed friction welding step is completed.

Next, a machining step is carried out as a step S60. In this step S60, the metal member 1 obtained in the step S50 is subjected to cutting and other machining. Referring to FIG. 12, in the step S60, in the state where the first member 10 and the second member 20 are joined together, the flash 29 formed due to deformation of the second member 20 in the step S40 is removed.

Referring to FIG. 12, in the step S60, further in the state where the first member 10 and the second member 20 are joined via the third member 30, the first member 10 is machined so that the recessed portion side surface 12 is removed. The first member 10 and the second member 20 are cut along the broken lines A, so the outer peripheral region including the recessed portion side surface 12 as well as the flash 29 is removed. Through the above procedure, the metal member 1, which is the joint body of the first member 10 and the second member 20 shown in FIG. 8, is obtained. The removal of the outer peripheral region including the recessed portion side surface 12 and the removal of the flash 29 may be performed continuously as a single step, or may be performed as separate steps at different times. Thereafter, the gas nitrocarburizing step is carried out as a step S70 as in the first embodiment. Further, finish work and other processes are performed as appropriate, whereby the metal member 1 is completed.

As described above, according to the method for producing the metal member 1 using the enclosed friction welding device 9 in the present embodiment, it is possible to produce the metal member 1 having a structure in which the first member 10 made of the first metal and the second member 20 made of the second metal having a smaller deformation resistance than the first metal are joined via the third member 30 made of the third metal having a smaller deformation resistance than the first metal. The metal member 1 having a structure in which the first member 10 and the second member 20 made of different metals are joined together via the third member 30 as a joint layer can be produced. The first member 10, the second member 20, and the third member 30 can be joined simultaneously.

Further, copper as the third metal constituting the third member 30 has a coefficient of thermal expansion that is greater than that of steel as the first metal constituting the first member 10 and smaller than that of brass as the second metal constituting the second member 20. Thus, the third member 30 is able to relax the stress between the first member 10 and the second member 20 that is generated because of the difference in thermal expansion coefficient in the heat treatment performed in the step S70. The interposition of the third member 30 between the first member 10 and the second member 20 prevents occurrence of cracking due to the above-described stress that is generated because of the difference in thermal expansion coefficient.

In the step S40 in the first through third embodiments described above, the deformation resistances of the second member 20 (second metal) and the third member 30 (third metal) in the temperature increased state are preferably smaller by 10% or more, more preferably smaller by 50% or more, and further preferably smaller by 80% or more, as compared to the deformation resistance of the first member 10 (first metal) in the temperature increased state. As explained above, the first member 10 and the second member 20 can be joined via the third member 30 as in the present embodiment in the case where the second member 20 (second metal) and the third member 30 (third metal) are smaller in deformation resistance than the first member 10 (first metal). If the difference in deformation resistance between the first member 10 and the second and third members 20 and 30 is small, however, not only the second and third members 20 and 30, but also the first member 10 may be deformed in the step S40.

In such a case, it would be difficult to join the first member 10 and the second member 20 via the third member 30 satisfactorily, thereby creating a need to strictly manage the temperatures of the first member 10, the second member 20, and the third member 30 in the step S40. Setting the deformation resistance of each of the second metal and the third metal in the temperature increased state smaller than that of the first metal by 10% or more in the step S40 facilitates achievement of good joining, and setting the same smaller by 50% or more, or even 80% or more, can further facilitate the achievement of good joining.

Example

Figure 13:
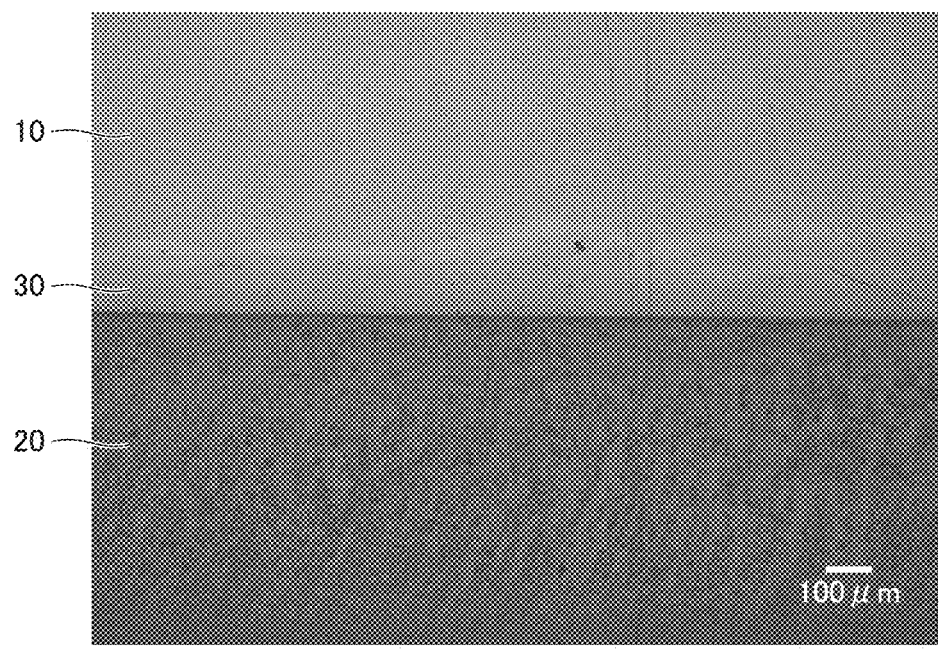
FIG. 13 is an optical micrograph showing the state at and around the joint portions.

An experiment was conducted in which a first member 10 and a second member 20 were joined via a third member 30 through a similar procedure as in the above embodiment to produce a sample of the metal member 1. For the metal (first metal) constituting the first member 10, JIS SCM440 (tempered and quenched), being steel (alloy steel for machine structural use), was adopted. For the metal (second metal) constituting the second member 20, high-strength brass was adopted. For the meatal (third metal) constituting the third member 30, copper was adopted. FIG. 13 shows a photograph of a cross section when the obtained sample was cut in a plane perpendicular to the joint surfaces.

Referring to FIG. 13, it is recognized that the first member 10 and the second member 20 are joined via the third member 30 favorably. It has been confirmed from the above experimental results that the metal member producing method according to the present invention is able to produce the metal member having a structure in which the members made of different metals are joined together via a joint layer.

While the case of adopting steel as the metal (first metal) constituting the first member, brass as the metal (second metal) constituting the second member, and copper as the metal (third metal) constituting the third member has been given by way of example in the embodiments and example described above, the metals adoptable in the present invention are not limited thereto. Examples of combination of adoptable metals are shown in Table 1 below.

TABLE 1

| First Member | Second Member | Third Member |
|---|---|---|
| steel | brass | copper |
| steel | aluminum alloy | copper |

TABLE 1-continued

| First Member | Second Member | Third Member |
|---|---|---|
| steel | nickel-based alloy | aluminum alloy |
| cemented carbide | steel | aluminum alloy |

As shown in Table 1, in the metal member producing method of the present invention, various combinations of the first member made of a first metal, the second member made of a second metal having a smaller deformation resistance than the first metal, and the third member made of a third metal having a smaller deformation resistance than the first metal can be adopted.

Further, in the above embodiments, the description was made about the case where the stress between the first member 10 and the second member 20 is relaxed by virtue of the thermal expansion coefficient of the third metal that is greater than that of the first metal and smaller than that of brass as the second metal. Alternatively, the above-described stress may be relaxed by virtue of, for example, the small Young's modulus of the third metal.

It should be understood that the embodiments and example disclosed herein are illustrative and non-restrictive in every respect. The scope of the present invention is defined by the terms of the claims, rather than the description above, and is intended to include any modifications and improvements within the scope and meaning equivalent to the terms of the claims.

Industrial Applicability

The metal member producing method according to the present invention may be applicable particularly advantageously to the production of a metal member having a structure in which members made of different metals are joined together via a joint layer.

DESCRIPTION OF REFERENCE NUMERALS

1: metal member; 9: enclosed friction welding device; 10: first member; 10A: recessed portion; 11: end face (recessed portion bottom surface); 12: recessed portion side surface; 20: second member; 21: end face; 22: outer peripheral surface; 29: flash; 30: third member; 30A: end face; 90: frame; 90A: shaft; 90B: spindle moving motor; 90C: spindle support portion; 91: base body; 92: mold holder (fixed-side chuck); 92A: bottom surface; 92B: radial chuck surface; 93: mold; 93A: cavity; 93B: cavity bottom wall; 93C: cavity sidewall; 94: rotation-side chuck; 95: spindle; 95B: spindle motor; 96: load sensor; 97: driving portion; 98: base portion; and 99: part.

The invention claimed is:

1. A method for producing a metal member comprising the steps of:
preparing a first member made of a first metal, a second member made of a second metal, and a third member made of a third metal; and
joining the first member and the second member via the third member, the step of joining the first member and the second member including steps of:
disposing the second member and the third member in a cavity of a mold, the cavity having a cavity sidewall defining the cavity;
heating the first member, the second member, and the third member by (i) stacking the first member, the third member, and the second member in this order, the third member having a third contact surface in contact with the first member, (ii) relatively rotating the first member with respect to the second member and to the third member about an axis of rotation, and (iii) pressing the rotating first member against the third member without changing an axial distance between the first member relative to the second member and the third member such that the third contact surface is surrounded by the cavity sidewall; and cooling the first member, the second member, and the third member, the first member, the second member, and the third member being stacked.

2. The method for producing a metal member according to claim 1, wherein the second metal and the third metal have less deformation resistance than the first metal.

3. The method for producing a metal member according to claim 2, wherein the mold includes a cavity bottom wall defining the cavity.

4. The method for producing a metal member according to claim 2, wherein during the step of heating the first member, the second member, and the third member, the first member is rotated while the mold is fixed.

5. The method for producing a metal member according to claim 1, wherein the second metal and the third metal have less deformation resistance than the first metal, the first member has a recessed portion, and during the step of heating the first member, the second member, and the third member, the third member is disposed in the recessed portion of the first member, and the second member is partially received in the recessed portion and is relatively rotated with respect to the third member while being pressed against the third member to heat the first member, the second member, and the third member.

6. The method for producing a metal member according to claim 5, wherein:

the first member includes:

a recessed portion bottom surface defining the recessed portion, and a recessed portion side surface defining the recessed portion and extending in a direction that intersects the recessed portion bottom surface, and during the step of heating the first member, the second member, and the third member, while the third member is in contact with the recessed portion bottom surface of the first member, the second member is relatively rotated while being relatively pressed against the third member.

7. The method for producing a metal member according to claim 5, wherein during the step of heating the first member, the second member, and the third member, the second member is deformed and contacts a recessed portion side surface.

8. The method for producing a metal member according to claim 6, further comprising, upon the first member and the second member being joined together, machining the first member to remove a recessed portion side surface.

9. The method for producing a metal member according to claim 5, wherein during the step of heating the first member, the second member, and the third member, the second member is rotated while the first member is fixed.

10. The method for producing a metal member according to claim 1, further comprising, upon the first member and the second member being joined together, removing a flash formed from deformation of the second member in the step of heating the first member, the second member, and the third member.

11. The method for producing a metal member according to claim 1, wherein the third member relaxes stress generated between the first member and the second member when the first member and the second member are joined together.

12. The method for producing a metal member according to claim 1, wherein during the step of heating the first member, the second member, and the third member, the second metal and the third metal are in a temperature increased state and each have a deformation resistance that is less than a deformation resistance of the first metal in a temperature increased state by at least 10%.

* * * * *